United States Patent [19]
Wallrabenstein et al.

[11] 3,876,586
[45] Apr. 8, 1975

[54] PRODUCTION OF A POLYACYLOXALAMIDRAZONE

[75] Inventors: Michael Wallrabenstein, Worth; Albert Schopf, Hering; Dieter Frank, Elsenfeld, all of Germany

[73] Assignee: Akzona Incorporated, Asheville, N.C.

[22] Filed: Aug. 30, 1973

[21] Appl. No.: 393,017

Related U.S. Application Data

[63] Continuation of Ser. No. 288,527, Sept. 13, 1972, abandoned, which is a continuation of Ser. No. 78,187, Oct. 5, 1970, abandoned.

[30] Foreign Application Priority Data
Oct. 9, 1969 Germany.............................. 1950907

[52] U.S. Cl......................... 260/78 TF; 260/29.2 N
[51] Int. Cl...................... C08g 20/20; C09g 20/22
[58] Field of Search .................................. 260/78 TF

[56] References Cited
UNITED STATES PATENTS

| | | | |
|---|---|---|---|
| 3,544,528 | 12/1970 | Magerlein et al. ............... | 260/78 TF |
| 3,573,261 | 3/1971 | Kersten et al. ................... | 260/78 TF |
| 3,583,953 | 6/1971 | Rupp et al. ...................... | 260/78 TF |

OTHER PUBLICATIONS
Chem. Abstracts, Vol. 67, 1967, 117411j, Saga et al.
J. of Polymer Science, pfB, Vol. 4, pp. 869–873, Saga et al., 1966, (Polymer Letters).

*Primary Examiner*—Howard E. Schain
*Attorney, Agent, or Firm*—Johnston, Keil, Thompson & Shurtleff

[57] ABSTRACT

Production of polyacyloxalamidrazones, especially a very high molecular weight polyterephthaloyloxalamidrazone having recurring units of the formula

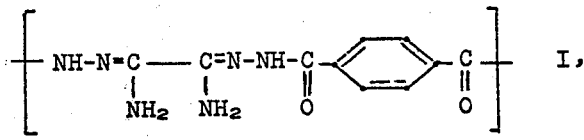

by a polycondensation of oxalic acid bisamidrazone with an acyl dihalide monomer such as terephthalic acid dichloride at temperatures of 0°C. to 60°C. in a two phase solvent system consisting essentially of water and a very pure tetrahydrofuran, with the addition of a substantial amount of lithium chloride or lithium sulfate as a salting-out agent and in the presence of an alkali metal carbonate or bicarbonate as an acid acceptor. High molecular weight polymer films or filaments can be formed from an alkaline solution of the polymer.

6 Claims, No Drawings

PRODUCTION OF A POLYACYLOXALAMIDRAZONE

This is a continuation of application Ser. No. 288,527, filed Sept. 13, 1972, which is a continuation of Ser. No. 78,187, filed Oct. 5, 1970, both now abandoned.

It has been previously been disclosed that polyacyloxalamidrazones can be produced by the reaction of oxalic acid bisamidrazone with a dicarboxylic acid dihalide in either a single phase or two-phase solvent system in the presence of an acid acceptor and with mixing at temperatures between about 0°C. and 150°C. Depending upon the solvents chosen for the polycondensation reaction and certain other conditions, it is possible to achieve some variation in the molecular weight of the resulting polycondensate. A two-phase solvent system is generally preferred in achieving higher molecular weight products, by means of a so-called interfacial polycondensation. For example, it is possible to employ a two-phase solvent system using water as one phase and a water-miscible organic liquid as the other phase, this organic liquid being inert to the dicarboxylic acid halide and having its miscibility with water substantially or completely suppressed by the addition of a salting-out agent. A suitable two-phase reaction medium of this type consists of water and tetrahydrofuran wherein a phase separation is achieved by the addition of soda as a salting-out agent. Also, since sodium carbonate is a basic substance, it is capable of simultaneously acting as an acid acceptor.

In these earliest developed processes for the production of polyacyloxalamidrazones, it was possible to achieve only relatively low molecular weight polycondensates as established by viscosity measurements. For example, depending upon the type of initial monomers, the reduced viscosity of the polycondensate did not exceed a value of 0.5 to 2.5, measured as a solution of 1 gram of the polymer in 100 ml of a 10 percent aqueous potassium hydroxide solution at 20°C.

In a further development of this polycondensation process, it has been possible to achieve somewhat higher molecular weight polymers by the reaction of oxalic acid bisamidrazone with a dicarboxylic acid dihalide at temperatures between about 0°C. and 60°C. in a two-phase solvent mixture consisting essentially of water and a very pure tetrahydrofuran in a volume ratio of 3:1 to 1:3, preferably employing as the salting-out agent about 3 to 15 percent by weight of sodium chloride or sodium sulfate (with reference to the amount of water). Also, alkali metal carbonates or bicarbonates are preferred as the acid acceptor. When following this special procedure, it has been possible to obtain polyacyloxalamidrazones with a reduced viscosity of from 3.3 to 5.4, again depending upon the initial monomers. The reduced viscosity in this case is also measured as noted above, and this particular measurement is employed throughout this specification.

Thus, the best results in the production of polyacyloxalamidrazones has been achieved in accordance with the earlier application of Magerlein et al, Ser. No. 716,364, filed Mar. 27, 1968. Since this earlier application sets forth the general polycondensation reaction in considerable detail, it is incorporated herein by reference as fully as if set forth in its entirety. For the production of much lower molecular weight polycondensates, attention is further directed to the earlier work of Saga et al, Kogyo Kagaku Zasshi, 69, page 2225 (1966); also compare Polymer Letters, page 869 (1966).

It is a primary object of the present invention to provide a process which leads to a polyterephthaloyloxalamidrazone having a substantially higher molecular weight than any previous polymer of this type, i.e., as evidenced by a considerably higher viscosity when measured under identical conditions in a 10 percent aqueous potassium hydroxide solution. Other objects and advantages of the invention will become more apparent upon consideration of the following detailed specification.

It has now been found, in accordance with the invention, that a polyterephthaloyloxalamidrazone of substantially higher viscosity can be obtained in the reaction of oxalic acid bisamidrazone and terephthalic acid dichloride at temperatures between about 0°C. and 60°C., using the two-phase solvent mixture of water and a substantially pure tetrahydrofuran, preferably in a volume ratio of 2:1 to 1:2, provided that the polycondensation reaction is carried out in this solvent mixture in the presence of a salting-out agent of lithium chloride or lithium sulfate in an amount of 7.5 to 30 percent by weight with reference to the amount of water and also in the presence of alkali metal carbonates or bicarbonates as the acid acceptor.

In order to obtain the polyterephthaloyloxalamidrazone product exhibiting substantially higher viscosities, it is essential to employ a very pure tetrahydrofuran. This pure tetrahydrofuran is preferably obtained by pretreatment with solid potassium hydroxide and then distilling it over sodium boron hydride or potassium permanganate. After purification, the tetrahydrofuran is desirably stored prior to use under an oxygen-free atmosphere. Such precautionary measures should be followed to avoid an undesirable reduction in the viscosity of the final product.

As the acceptor for the acid set free in the polycondensation reaction, it has been found to be especially advantageous to employ alkali metal bicarbonates and particularly alkali metal carbonates. The sodium and potassium carbonates are especially preferred. The acid acceptor is employed in a conventional amount, i.e. in an amount sufficient to take up the hydrogen chloride split off during the reaction.

It is particularly essential for purposes of the present invention to employ lithium chloride, lithium sulfate or mixtures thereof in an amount of about 7.5 to 30 percent by weight with reference to the amount of water. It is the presence of these added lithium chloride or sulfate salts in combination with the other reaction conditions which has a pronounced effect in the increase of the viscosity or molecular weight of the polyterephthaloyloxalamidrazone product. Especially good results are achieved when using these lithium salts in an amount of 10 to 25 percent by weight with reference to the amount of water. In general, the volume ratio of water:tetrahydrofuran should be within about 2:1 to 1:2, but it has been found that a volume ratio of about 3:2 to 1:1 is especially suitable, particularly when employing sodium carbonate or potassium carbonate as the acid acceptor. It is also preferable to carry out the polycondensation at a reaction temperature of about 10°C. to 40°C., these temperatures being maintained in a conventional manner by removing the heat of reaction. It is not essential to maintain a constant temperature throughout the reaction, and it will be generally understood that the recited temperature conditions refer to the temperature peak which occurs at the beginning of the reaction. As a matter of convenience, the reaction can be carried out at about room temperature or at slightly elevated temperatures which do not exceed 60°C. and which are preferably lower than 40°C.

In carrying out the reaction, the various materials are brought together in the usual manner, but preferably by first dissolving the lithium chloride or lithium sulfate in water and separately preparing another solution of the acid acceptor in water, thereafter combining the two solutions at about room temperature. The oxalic acid bisamidrazone is also preferably dissolved together with the lithium salt, it being desirable in all cases to employ a substantially oxygen-free distilled water. The terephthalic acid dichloride is dissolved in the pure tetrahydrofuran and then added together with this organic solvent under strong mixing conditions to the water containing all of the other reaction components. At the same time, the reaction mixture is cooled sufficiently by any conventional means, e.g., by indirect heat exchange with any suitable cooling fluid, so as to withdraw the heat of reaction and maintain the temperature within the defined limits. After completion of the reaction, the polycondensate product can be separated or isolated from the two-phase solvent medium by conventional filtration or centrifuging, preferably followed by washing with water and alcohol and then purifying the product by distillation.

When the process is carried out in accordance with the present invention, it is possible to obtain a polyterephthaloyloxalamidrazine with a reduced viscosity as high as 12 (measured as a solution of 1 gram of the polymer in 100 ml of a 10 percent by weight aqueous solution of potassium hydroxide at 20°C.). It is thus possible to obtain essentially new and higher molecular weight polycondensates with values for the above-defined reduced viscosity of about 6 to 12 and preferably more than 7 up to about 12. These high molecular weight polycondensates can be dissolved in a dilute aqueous alkali metal hydroxide solution and then spun or formed in an acid bath in a conventional manner to produce filaments, films, foils or the like.

The invention is further illustrated by the following examples.

EXAMPLE 1

A solution of 112.4 grams (2.65 mols) of lithium chloride and 17.4 grams (150 millimols) of oxalic acid bisamidrazone in 500 ml. of oxygen-free distilled water and a solution of 15.9 grams (150 millimols) of sodium carbonate in 250 ml. of oxygen-free distilled water are brought to room temperature, combined with each other and placed in the mixing vessel of a Kotthoff mixer. While rapidly mixing at about $2.8 \times 10^3$ r.p.m. and cooling with water, a solution of 30.05 grams (150 millimols) of terephthalic acid dichloride in 500 ml. of pure tetrahydrofuran is added to the mixing vessel. The reaction is completed after mixing for about 20 to 25 minutes. The polycondensate is filtered off on a suction filter, washed three times with water and finally washed with methanol. Residual water is separated from the polycondensate by azeotropic distillation with ligroin. The product is then dried in a vacuum at 60°C. The reduced viscosity of this product is 11.3 (measured as a solution of 1 gram of the polycondensate in 100 ml. of a 10 percent potassium hydroxide aqueous solution at 20°C.).

EXAMPLES 2 – 15

All of these examples are carried out in the same manner as Example 1 with variations in materials and the final results being set forth in the following table. The oxalic acid bisamidrazone and terephthalic acid dichloride monomers are used in equimolar amounts as listed in the second column of the table. The viscosity of the polycondensate product is measured as in Example 1.

TABLE

| Example No. | Each monomer (millimols) | Water (ml) | Tetrahydrofuran (ml) | Lithium Salt (G/100 ml.H$_2$O) | Acid acceptor | Viscosity |
| --- | --- | --- | --- | --- | --- | --- |
| 2  | 75    | 750 | 750  | LiCl 15g              | Na$_2$CO$_3$  | 9.5  |
| 3  | 75    | 750 | 500  | LiCl 15g              | "             | 12.0 |
| 4  | 75    | 500 | 1000 | LiCl 15g              | "             | 9.3  |
| 5  | 75    | 750 | 500  | LiCl 10g              | "             | 8.6  |
| 6  | 75    | 750 | 500  | LiCl 20g              | "             | 11.1 |
| 7  | 150   | 750 | 500  | LiCl 20g              | "             | 10.2 |
| 8  | 225   | 750 | 500  | LiCl 20g              | "             | 8.2  |
| 9  | 225   | 750 | 500  | LiCl 25g              | "             | 7.8  |
| 10 | 75    | 750 | 500  | LiCl 15g              | K$_2$CO$_3$   | 10.2 |
| 11 | 37.5  | 750 | 500  | LiCl 15g              | Na$_2$CO$_3$  | 9.3  |
| 12 | 150   | 750 | 500  | LiCl 15g              | NaHCO$_3$     | 7.3  |
| 13 | 75    | 750 | 500  | LiCl 15g              | KHCO$_3$      | 7.1  |
| 14 | 75    | 750 | 500  | Li$_2$SO$_4$ 15g      | Na$_2$CO$_3$  | 10.2 |
| 15 | 75    | 750 | 750  | Li$_2$SO$_4$ 25g      | Na$_2$CO$_3$  | 8.4  |

Similar results can be achieved by using terephthalic acid dibromide in place of the dichloride, and for purposes of the present invention, these two halides are considered to be equivalent.

Although Saga et al, supra, have disclosed a reaction of oxalic acid bisamidrazone and terephthaloyl chloride in dimethylformamide containing 5 percent by weight of lithium chloride, this solution polycondensation in a single solvent phase permits the production of only very low molecular weight polycondensates. For example, if one reacts oxalic acid bisamidrazone with terephthalic acid dichloride in dimethylacetamide as taught by this reference, or in dimethylacetamide, N-methylpyrrolidine or hexamethylphosphoric acid triamide, in the presence of 5 percent lithium chloride, the resulting polyterephthaloyloxalamidrazone has an inherent viscosity of only 0.20 to 0.76. As will be apparent from experiments by these authors, the addition of lithium chloride, for example to hexamethylphosphoric acid triamide, fails to show any viscosity increasing effect. In fact, a comparative experiment carried out without the addition of lithium chloride actually gave a product with somewhat higher viscosity (note Table 1, Experiments 5 and 6 of Saga et al). Under these circumstances, it was quite surprising and unforeseeable that lithium chloride and/or lithium sulfate would exhibit a substantial viscosity increasing effect when employed in an interfacial polycondensation as required by the present invention.

The process of the present invention is therefore very advantageous in permitting one to achieve very high molecular weight polyterephthalolyloxalamidrazones. Furthermore, it has been noted that the solubility of the oxalic acid bisamidrazone in the aqueous lithium chloride phase is about three times greater than the solubility of this monomer in the aqueous phase employed in previous interfacial polycondensation reactions. This represents a further advantage of the invention, since one can react about three times the amount of oxalic acid bisamidrazone with the acyl dihalide when using the same amount of water as the aqueous phase. In other words, it is possible to achieve a much higher yield per unit volume of the reaction medium. Most importantly, the polycondensates prepared by the process of the present invention exhibit a very desirable high molecular weight with corresponding advantages in the preparation of films, filaments or the like.

We claim:

1. In a process for the production of polyterephthaloyloxalamidrazone by the polycondensation reaction of oxalic acid bisamidrazone with terephthalic acid dichloride in a two phase solvent system and in the presence of an acid acceptor while mixing and withdrawing the heat of reaction, the improvement which comprises carrying out the polycondensation reaction at a temperature of about 0°C. to 60°C. in a solvent mixture of water and a substantially pure tetrahydrofuran with a volume ratio of water:tetrahydrofuran of about 2:1 to 1:2, in the presence of a salting-out agent selected from the group consisting of lithium chloride and lithium sulfate in an amount of 7.5 to 30 percent by weight with reference to the amount of water and in the presence of an acid acceptor selected from the group consisting of alkali metal carbonates and bicarbonates, the reaction period being sufficient to yield a polyterephthaloyloxalamidrazone having a reduced viscosity of about 7 to 12, measured as a solution of 1 gram of the polycondensate in 100 ml. of a 10 percent potassium hydroxide aqueous solution at 20°C.

2. A process as claimed in claim 1 wherein the reaction temperature is about 10°C. to 40°C.

3. A process as claimed in claim 1 wherein the volume ratio of water:tetrahydrofuran is about 3:2 to 1:1, the salting-out agent is present in an amount of about 10 to 25 percent by weight with reference to the amount of water and the acid acceptor is a compound selected from the group consisting of sodium carbonate and potassium carbonate.

4. A process as claimed in claim 3 wherein the salting-out agent is lithium chloride.

5. A process as claimed in claim 3 wherein the salting-out agent is lithium sulfate.

6. A process as claimed in claim 3 wherein the reaction temperature is about 10°C. to 40°C.

* * * * *